(12) United States Patent
Bleeck et al.

(10) Patent No.: US 11,289,719 B2
(45) Date of Patent: Mar. 29, 2022

(54) FUEL CELL ARRANGEMENT HAVING DIFFERENTIAL PRESSURE CONTROL FOR AN H2/O2 FUEL CELL

(71) Applicant: Vitesco Technologies GmbH, Regensburg (DE)

(72) Inventors: Matthias Bleeck, Pentling (DE); Christoph Aumueller, Falkenstein (DE); Florian Braun, Roetz (DE); Stefan Kulzer, Zell (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 16/960,655

(22) PCT Filed: Jan. 9, 2019

(86) PCT No.: PCT/EP2019/050365
§ 371 (c)(1),
(2) Date: Jul. 8, 2020

(87) PCT Pub. No.: WO2019/137924
PCT Pub. Date: Jul. 18, 2019

(65) Prior Publication Data
US 2020/0365919 A1   Nov. 19, 2020

(30) Foreign Application Priority Data

Jan. 11, 2018   (DE) ..................... 10 2018 200 350.5

(51) Int. Cl.
*H01M 8/04*      (2016.01)
*H01M 8/04089*   (2016.01)
(Continued)

(52) U.S. Cl.
CPC ...... *H01M 8/04104* (2013.01); *G05D 16/028* (2019.01); *G05D 16/0663* (2013.01); *H01M 8/04753* (2013.01); *H01M 8/04783* (2013.01)

(58) Field of Classification Search
CPC ................................................ H01M 8/04104
See application file for complete search history.

(56) References Cited

U.S. PATENT DOCUMENTS 8,586,258 B2    11/2013  Maier
2005/0118475 A1*  6/2005  Ueda ................. H01M 8/04097
                                                      429/444
(Continued)

FOREIGN PATENT DOCUMENTS

DE   102005006355   8/2006
DE   102005006357   8/2006
(Continued)

OTHER PUBLICATIONS

English translation of the International Search Report of the International Searching Authority for International Application PCT/EP2019/050365, dated Apr. 9, 2019, 2 pages, European Patent Office, HV Rijswijk, Netherlands.
(Continued)

*Primary Examiner* — Olatunji A Godo
(74) *Attorney, Agent, or Firm* — W. F. Fasse

(57) ABSTRACT

A fuel cell arrangement has an anode connected to an H2 inflow and a cathode connected to an O2 inflow. A differential pressure control device is arranged between the H2 inflow and the O2 inflow for controlling a differential pressure between the H2 inflow and the O2 inflow. The differential pressure control device has a fluid connection between the H2 inflow and the O2 inflow, in which a deflectable diaphragm is arranged, to which a pin is coupled, which, when the diaphragm is deflected, opens a valve arranged in the H2 inflow.

20 Claims, 3 Drawing Sheets

(51) Int. Cl.
      *G05D 16/00* (2006.01)
      *G05D 16/06* (2006.01)
      *H01M 8/04746* (2016.01)

(56) References Cited

U.S. PATENT DOCUMENTS

2008/0038608 A1    2/2008  Yoshida
2008/0102336 A1    5/2008  Strohl et al.

FOREIGN PATENT DOCUMENTS

DE    102011110903    3/2012
JP      60-130060 A    7/1985
JP     2005-135617 A    5/2005

OTHER PUBLICATIONS

PCT International Preliminary Report on Patentability including English Translation of PCT Written Opinion of the International Searching Authority for International Application PCT/EP2019/050365, dated Jul. 14, 2020, 7 pages, International Bureau of WIPO, Geneva, Switzerland.
German Office Action dated Oct. 31, 2018, in German Patent Application No. 10 2018 200 350.5, 6 pages, with partial English translation, 3 pages.

* cited by examiner

FUEL CELL ARRANGEMENT HAVING DIFFERENTIAL PRESSURE CONTROL FOR AN H2/O2 FUEL CELL

FIELD OF THE INVENTION

The invention relates to a fuel cell arrangement for a hydrogen/oxygen fuel cell.

BACKGROUND INFORMATION

Chemically stored energy is converted into electrical energy in a fuel cell, wherein one reactant is oxidized and the other reactant is reduced. In a hydrogen/oxygen fuel cell (H2/O2 fuel cell), hydrogen (H2) is oxidized by the release of electrons at an anode, while oxygen (O2) is reduced by the acceptance of electrons at a cathode. As a result of this redox reaction, chemical energy stored in the reactants is converted into electrical energy at the anode or respectively cathode and can be tapped from there and utilized.

One exemplary type of utilization is utilizing the electrical energy to drive motor vehicles, wherein the efficiency during the conversion of the chemically bonded energy into electrical energy is up to 60%.

During the deployment of such H2/O2 fuel cells, the hydrogen is provided in a hydrogen tank at a pressure of approximately 350 bar to 700 bar for the application.

FIG. 4 shows an exemplary fuel cell arrangement which is known from the prior art and which can be used for driving motor vehicles.

The fuel cell arrangement 10 in FIG. 4 has a hydrogen tank 12 which provides hydrogen 14 for a redox reaction in a H2/O2 fuel cell 16. In order to prevent the hydrogen 14 escaping from the hydrogen tank 12 in an uncontrolled manner in the event of a defect, a shutoff valve 18 is arranged immediately after the hydrogen tank 12. The hydrogen 14 is stored at a high pressure of approximately 350 bar to 700 bar in the hydrogen tank 12. This hydrogen 14, which is supplied at high pressure, has its pressure reduced by means of a pressure reducer 20 to a lower pressure stage in the range of a medium pressure of approximately 10 bar to 70 bar. Within said pressure stage, the hydrogen 14 is supplied by means of lines 22 and a hydrogen metering valve 24 to an anode 26 of the H2/O2 fuel cell 16. The metered addition of the hydrogen 14 is effected in a targeted manner by means of the hydrogen metering valve 24. The prevailing pressure of the hydrogen 14 at the anode 26 is low: in a range of approx. 0.8 bar to 4 bar. A hydrogen mass flow is adjusted in the hydrogen metering valve 24 with the pressure gradient from the medium pressure to the low pressure. The pressure in the anode 26, which forms an enclosed volume, is controlled in that said volume is filled by means of a defined mass flow of hydrogen 14. As a result, a defined pressure of the hydrogen 14 is adjusted in the volume of the region of the anode 26.

The hydrogen 14 reacts in the H2/O2 fuel cell 16 with oxygen 28 which is supplied to a cathode 30 of the H2/O2 fuel cell 16. The oxygen 28 is supplied to the cathode 30 by means of a separate feeding unit 32 which ensures that sufficient oxygen 28 at a defined pressure is available in said region.

On the side of the anode 26, the concentration of the hydrogen 14 lowers over time due to the reaction of the hydrogen 14 with the oxygen 28. In order to ensure that there is always sufficient hydrogen 14 available here for the operation of the H2/O2 fuel cell 16, the hydrogen 14 is recirculated within the region of the anode 26. This can be effected, for example, by a gas blower 34 or an ejector. The hydrogen 14 is conducted back from an outlet 36 of the anode 26 to an inlet 38 of the anode 26. As a result, a gas exchange is effected within the anode 26, wherein unconsumed hydrogen 14 from the volume in the anode 26 can be utilized for the reaction with oxygen 28.

If there is no longer enough hydrogen 14 present in the volume of the anode 26, the gas is conducted out of the volume by a release valve 40. The hydrogen metering valve 24 adds new metered hydrogen 14 to the anode 26. It is important that a defined pressure is observed on the side of the anode 26. This is because a pressure difference between the anode 26 and the cathode 30 is required for the reaction of the hydrogen 14 with the oxygen 28. At the same time, care must be taken that a diaphragm 42 (fuel cell membrane) arranged between the anode 26 and the cathode 30 is not damaged when a pressure difference between the anode 26 and the cathode 30 is too high.

In order to control said pressure difference, the pressure on the anode side and the cathode side is measured by sensors 44. An electronic regulating unit 46 adjusts the hydrogen metering valve 24 by means of a control algorithm such that the pressure in the anode 26 is controlled within a predefined range, and the required pressure difference between the anode 26 and the cathode 30 is present for the reaction of the hydrogen 14 and oxygen 28.

Until now, the precise controlling of said pressure in the anode 26 and the required pressure difference between the anode 26 and the cathode 30 have therefore been achieved by a complex control system consisting of sensors 44, an electronic regulating unit 46 and one or more electrohydraulic hydrogen metering valves 24.

SUMMARY OF THE INVENTION

The object of the invention is to propose a simplified fuel cell arrangement in this respect.

This object can be achieved with a fuel cell arrangement having the combination of features according to the invention as set forth herein.

A fuel cell arrangement for an H2/O2 fuel cell has an anode, at which H2 is oxidized during operation, and which is connected to an H2 inflow for supplying H2 to the anode, wherein a valve having a valve seat and a valve element is arranged in the H2 inflow, which interact in a closing position, in order to interrupt an inflow of H2 from the H2 inflow to the anode. The fuel cell arrangement further has a cathode, at which O2 is reduced during operation, and which is connected to an O2 inflow for supplying O2 to the cathode. A differential pressure control device is arranged between the H2 inflow and the O2 inflow for controlling a differential pressure between the H2 inflow and the O2 inflow, the differential pressure control device having a fluid connection between the H2 inflow and the O2 inflow in which there is arranged a diaphragm for sealing the fluid connection which can be deflected by a deflection force acting due to a pressure difference between the H2 inflow and the O2 inflow. A pin is coupled to the deflectable diaphragm and the valve element in such a manner that the pin, when the diaphragm is deflected in the direction of the H2 inflow, presses the valve element away from the valve seat in the opening direction.

The fuel cell arrangement described can control the differential pressure between the H2 inflow and the O2 inflow and, consequently, between the anode and cathode with only one component, namely the differential pressure control device, and without additional sensors. The system has a robust and compact construction, and an electrical regulating unit can also be dispensed with since the system can have a purely mechanical construction.

The differential pressure control device, which consequently provides an improved hydrogen metering valve, acts as follows: the pressure in the O2 inflow to the cathode acts on the deflectable diaphragm, such that the position thereof changes depending on a pressure difference between the H2 inflow and the O2 inflow. Due to the change in position of the diaphragm, the pin coupled to the diaphragm presses the valve element, as a result of which the position of the valve element is changed and a cross-section on the valve seat is released i.e. opened. The supply of the hydrogen into the anode from the H2 supply is thereby regulated dependent on or as a function of the resulting open cross-section of the valve.

The mass of hydrogen which is supplied to the anode therefore results from the force equilibrium between a pressure which acts in the H2 inflow and a pressure which acts in the O2 inflow, and the pressure surfaces on the valve element or respectively on the valve seat. Due to this construction, a constant pressure difference can be adjustingly set during the operation of the fuel cell arrangement.

A second deflectable diaphragm for sealing the fluid connection is preferably arranged in the fluid connection at a distance from the abovementioned (first) deflectable diaphragm which can be deflected by the deflection force acting due to the pressure difference between the H2 inflow and the O2 inflow.

Preferably, the first diaphragm seals the fluid connection toward the H2 inflow, while the second diaphragm seals the fluid connection toward the O2 inflow.

In an advantageous configuration, a pressure transmission volume is formed by the arrangement of the first and second diaphragms at a distance from one another in the fluid connection, which pressure transmission volume is filled with a pressure transmission fluid that can transmit the deflection force exerted by the pressure difference between the H2 inflow and the O2 inflow from the second diaphragm to the first diaphragm.

The pressure at an inlet of the cathode, that means in the O2 inflow, acts on the second diaphragm in the cathode region. The greater the pressure in the cathode region, the more the second diaphragm is deformed and acts on the pressure transmission fluid in the pressure transmission volume. The pressure transmission fluid continues to act on the first diaphragm at the H2 inflow, that means in the anode region.

From the other side of the first diaphragm, the pressure acts in the anode region, that means in the H2 inflow, on the first diaphragm, such that the position of the first diaphragm depends on the pressure difference between the inlet of the cathode, that means the O2 inflow, and the pressure in the region of the anode, that means in the H2 inflow.

The first diaphragm and the second diaphragm preferably have different active surfaces (i.e. surface areas) for accepting the deflection force. The dependence of the position of the first diaphragm on the pressure difference between the H2 inflow and the O2 inflow can consequently be constructively adjusted by means of the ratios of the active surfaces (surface areas) of the two diaphragms.

A first active surface of the first diaphragm is advantageously smaller than a second active surface of the second diaphragm. Consequently, it is possible, even in the case of small pressure differences between the H2 inflow and the O2 inflow, to realize a sufficiently large deflection of the first diaphragm and, consequently, a raising of the valve element from the valve seat.

The valve preferably has a compression spring which is arranged in the H2 inflow and exerts a spring force on the valve element, which biases the valve element in a closing direction onto the valve seat. Due to the arrangement of the compression spring, the valve element can be securely held on the valve seat in the closing position. The pressure of the hydrogen acting in the H2 inflow consequently acts in the same direction as the spring force of the compression spring such that the valve element is securely held in the valve seat by the forces both of the flowing hydrogen and of the compression spring.

An actuator for controlling the spring force of the compression spring is preferably provided. By providing such an actuator it is possible to additionally adjust the force equilibrium. As a result, the pressure difference to be controlled between the cathode and the anode can additionally be tweaked.

The actuator is, for example, formed by an actuatable piezo actuator. In an alternative configuration, it is possible to form the actuator by an actuatable electromagnetic actuator. It is however conceivable, in a further possible embodiment, to configure the actuator by a controllable electromotor which has a spindle.

BRIEF DESCRIPTION OF THE DRAWINGS

Advantageous configurations of the invention are explained in greater detail below, with reference to the appended drawings, wherein.

DETAILED DESCRIPTION OF EXAMPLE EMBODIMENTS OF THE INVENTION

Figure 1:
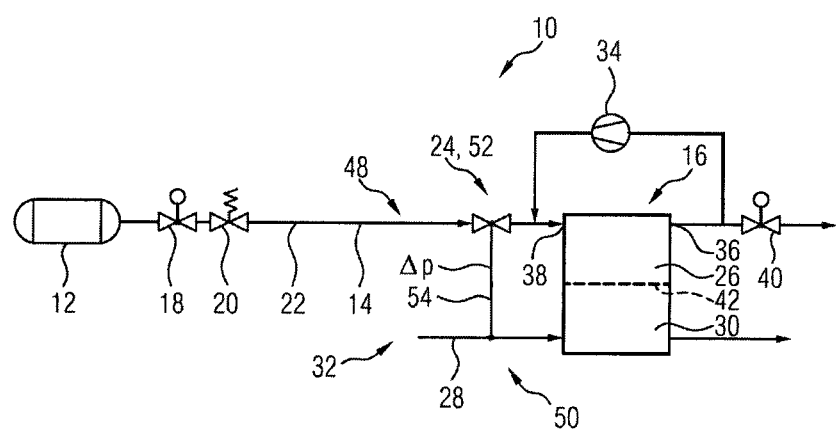
FIG. 1 shows a schematic overview of a fuel cell arrangement having a fuel cell and a hydrogen metering valve.

FIG. 1 shows an overview of a fuel cell arrangement 10 which has an H2/O2 fuel cell 16 which comprises an anode 26 and a cathode 30. Hydrogen 14 is oxidized in the anode 26, while oxygen 28 is reduced in the cathode 30. In order to feed the anode 26, a hydrogen tank 12 is provided, which stores the hydrogen 14 at high pressure. The hydrogen 14 is supplied by means of lines 22, in which a shutoff valve 18 and a pressure reducer 20 are arranged, to a hydrogen metering valve 24 which itself adjusts a pressure of the hydrogen 14 in an H2 inflow 48 to the anode 26 and, therefore, in the anode 26. Oxygen 28 is supplied by means of an O2 inflow 50 to the cathode 30.

An inlet 38 of the anode 26 is connected to an outlet 36 of the anode 26 by means of a gas blower 34, in order to make possible a recirculation of the hydrogen 14. If, due to the reaction between the hydrogen 14 and oxygen 28, a large part of the hydrogen 14 is consumed, the consumed gas from the anode 26 can be let out of the anode 26 by means of a release valve 40. The hydrogen metering valve 24 then meters fresh hydrogen 14 to the anode 26 by means of the H2 inflow 48.

The hydrogen metering valve 24 is configured as a differential pressure control device 52 which controls a pressure difference Δp between the H2 inflow 48 and the O2 inflow 50.

Figure 2:
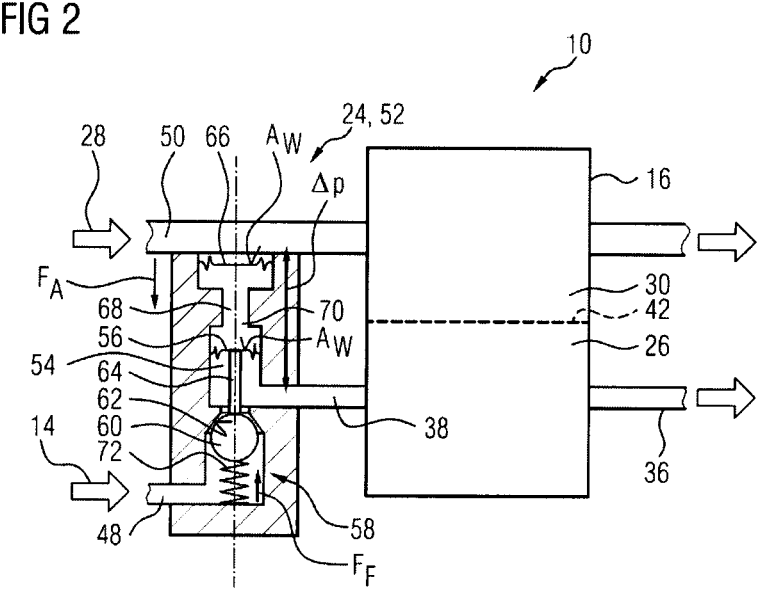
FIG. 2 shows a schematic detailed representation of a partial region of the fuel cell arrangement from FIG. 1 in a first embodiment.

The construction of a first embodiment of the differential pressure control device 52 is shown in greater detail in a representation of the fuel cell arrangement 10 in FIG. 2.

The differential pressure control device 52 has an enclosed fluid connection 54 between the H2 inflow 48 and the O2 inflow 50 as shown in FIG. 2. A first diaphragm 56, which can be deflected from its position by a pressure difference Δp between the H2 inflow 48 and the O2 inflow 50 and a deflection force $F_A$ acting as a result, is arranged in the fluid connection 54.

A passive valve 58 is arranged in the H2 inflow 48, which has a valve element 60 and a valve seat 62. In a closed position, the valve seat 62 and the valve element 60 interact such that the valve 58 is closed.

A pin 64 is coupled to the first diaphragm 56 and the valve element 60. As soon as the first diaphragm 56 is deflected in the direction toward the H2 inflow 48, the first diaphragm 56 presses the pin 64 onto the valve element 60 such that the latter moves away from the valve seat 62 and the valve 58 opens. As a result, the H2 inflow 48 to the anode 26 is released i.e. opened and hydrogen 14 can flow to the anode 26.

A second diaphragm 66 is arranged at a distance from the first diaphragm 56 in the fluid connection 54, which second diaphragm 66 can likewise have its position changed due to the pressure difference Δp.

The first diaphragm 56 seals the fluid connection 54 toward the H2 inflow 48, while the second diaphragm 66 seals the fluid connection 54 toward the O2 inflow 50. Due to the arrangement of the two diaphragms 56, 66 at a distance from one another in the fluid connection 54, an enclosed pressure transmission volume 68 is formed between the two diaphragms in the fluid connection 54 as shown in FIG. 2, wherein said pressure transmission volume 68 is filled with a pressure transmission fluid 70. If the second diaphragm 66 is then deflected in the direction toward the H2 inflow 48 due to the pressure difference Δp between the H2 inflow 48 and the O2 inflow 50, the pressure transmission fluid 70 transmits the deflection force $F_A$ acting as a result from the second diaphragm 66 to the first diaphragm 56, which consequently opens the valve 58.

The greater the pressure in the O2 inflow 50 is, the more the second diaphragm 66 is deformed and the more said deformation acts on the pressure transmission fluid 70 in the pressure transmission volume 68. The pressure transmission fluid 70 continues to act on the first diaphragm 56 in the region of the H2 inflow 48. From the side of the H2 inflow 48, the pressure in the region of the anode 26 acts on the first diaphragm 56 such that the position of the first diaphragm 56 depends on the pressure difference Δp between the O2 inflow 50 and the H2 inflow 48. The dependence of the position of said first diaphragm 56 on the pressure difference Δp can be constructively adjusted by appropriately selecting/ designing the ratio of the active surfaces (i.e. surface areas) $A_w$ of the diaphragms 56, 66. If, for example, the first diaphragm 56 has a smaller active surface $A_w$ than the second diaphragm 66, a small pressure difference Δp also produces a relatively large deflection of the first diaphragm 56 and, consequently, a rapid opening of the valve 58.

Due to the change in position of the first diaphragm 56, the pin 64 presses the valve element 60, as a result of which the position of the valve element 60 is changed relative to the valve seat 62 and, consequently, a cross-section of the valve seat is released i.e. opened. Thereby the supply of the hydrogen 14 into the anode 26 is regulated dependent on or as a function of the resulting open cross-section of the valve.

The valve 58 additionally has a compression spring 72 which is arranged in the H2 inflow and exerts a spring force $F_F$ on the valve element 60, as a result of which the valve element 60 is biased in a closing direction onto the valve seat 62. Thanks to the spring force $F_F$, the bias of the valve element 60 can be adjusted, such that the deflection force $F_A$ which is needed to raise the valve element 60 from the valve seat 62 can be influenced by means thereof.

The quantity of hydrogen which is supplied to the anode 26 therefore results from the force equilibrium between the prevailing pressure in the O2 inflow 50, the prevailing pressure in the H2 inflow 48, the active surfaces on the valve element 60 and the valve seat 62 as well as the spring force $F_F$ of the compression spring 72, which holds the valve element 60 in its position, and which acts, from the side opposite the pin 64, on the valve element 60.

By means of said force equilibrium, a constant pressure difference Δp between the anode 26 and the cathode 30 can be adjusted during the operation of the fuel cell 16.

Figure 3:
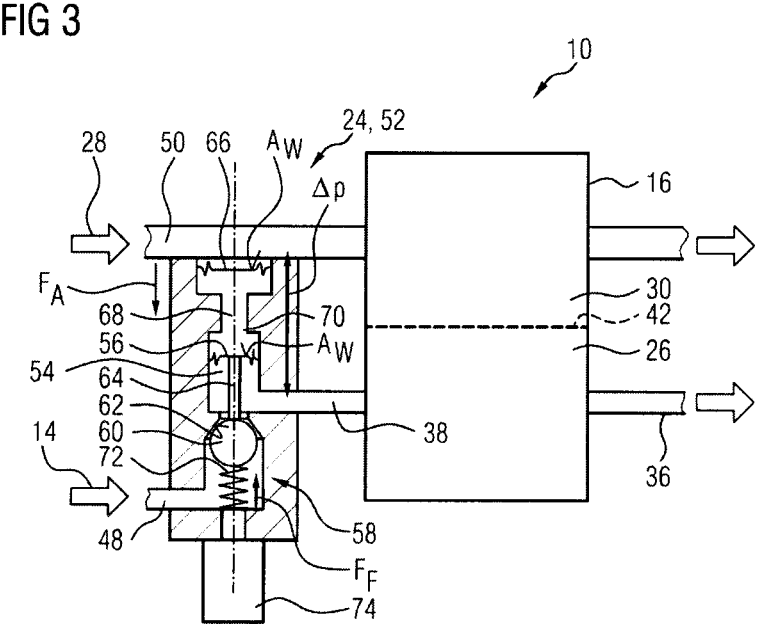
FIG. 3 shows a schematic detailed representation of a partial region of the fuel cell arrangement from FIG. 1 in a second embodiment.
Figure 4:
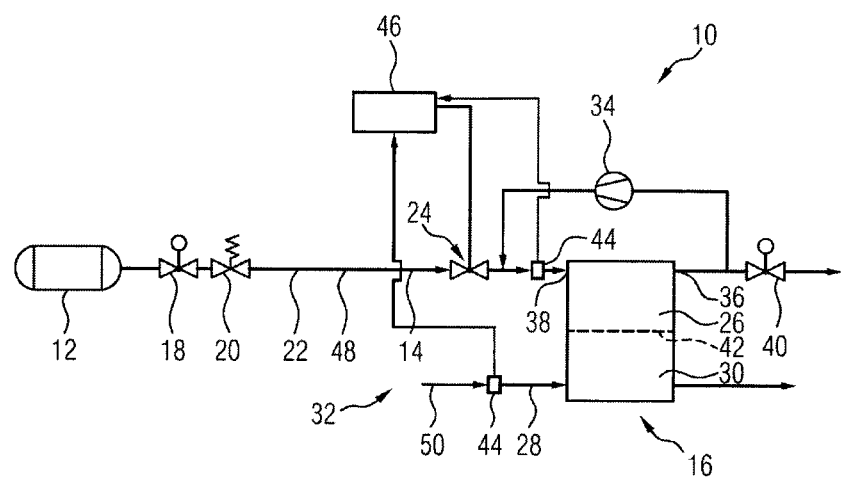
FIG. 4 shows a schematic overview of a fuel cell arrangement having a hydrogen metering valve from the prior art.

FIG. 3 shows a schematic representation of a second embodiment of the fuel cell arrangement 10, which has substantially the same construction as the first embodiment which is shown in FIG. 2. In the case of the second embodiment, an actuator 74 is merely additionally provided, which can control the spring force $F_F$ of the compression spring 72. The force equilibrium can therefore be influenced by the additional actuator 74, which can be configured, for example, by a piezo actuator, an electromotor having a spindle or an electromagnet. As a result, the pressure difference Δp to be controlled between the cathode 30 and the anode 26 can additionally be tweaked.

The invention claimed is:

1. A fuel cell arrangement for an H2/O2 fuel cell, wherein said fuel cell arrangement comprises
    an anode, at which H2 is oxidized during operation, and which is connected to an H2 inflow for supplying H2 to the anode, wherein a valve having a valve seat and a valve element is arranged in the H2 inflow, wherein the valve seat and the valve element interact with one another in a closed position thereof to interrupt a flow of H2 from the H2 inflow to the anode,
    a cathode, at which O2 is reduced during operation, and which is connected to an O2 inflow for supplying O2 to the cathode,
    a differential pressure control device arranged between the H2 inflow and the O2 inflow for controlling a pressure difference between the H2 inflow and the O2 inflow,
    wherein the differential pressure control device comprises an enclosed fluid connection between the H2 inflow and the O2 inflow, a deflectable diaphragm arranged in the enclosed fluid connection to provide a seal between the H2 inflow and the O2 inflow in the enclosed fluid connection, wherein the deflectable diaphragm can be deflected by a deflection force acting due to the pressure difference between the H2 inflow and the O2 inflow, and a pin coupled to the deflectable diaphragm and the valve element such that the pin can move the valve element away from the valve seat in an opening direction when the deflectable diaphragm becomes deflected by the deflection force.

2. The fuel cell arrangement according to claim 1, further comprising an additional diaphragm arranged in the enclosed fluid connection, at a distance from the deflectable diaphragm, to provide another seal between the H2 inflow and the O2 inflow in the enclosed fluid connection.

3. The fuel cell arrangement according to claim 2, wherein the deflectable diaphragm seals the enclosed fluid connection toward the H2 inflow, and the additional diaphragm seals the enclosed fluid connection toward the O2 inflow.

4. The fuel cell arrangement according to claim 2, wherein an enclosed pressure transmission volume is bounded and confined between the additional diaphragm and the deflectable diaphragm within the enclosed fluid connection, and wherein the enclosed pressure transmission volume is filled with a pressure transmission fluid that can transmit the deflection force from the additional diaphragm to the deflectable diaphragm.

5. The fuel cell arrangement according to claim 4, wherein the deflectable diaphragm and the additional diaphragm respectively have different active surface areas for accepting the deflection force.

6. The fuel cell arrangement according to claim 5, wherein the different active surface areas comprise a first active surface area of the deflectable diaphragm and a second active surface area of the additional diaphragm, wherein the first active surface area is smaller than the second active surface area.

7. The fuel cell arrangement according to claim 1, further comprising a compression spring which is arranged in the H2 inflow and exerts a spring force on the valve element, wherein the spring force biases the valve element in a closing direction toward the valve seat.

8. The fuel cell arrangement according to claim 7, further comprising an actuator arranged to act on the compression spring for controlling the spring force of the compression spring.

9. The fuel cell arrangement according to claim 8, wherein the actuator comprises an actuatable piezo actuator, an actuatable electromagnetic actuator, or a controllable electromotor having a spindle.

10. A fuel cell system comprising a fuel cell and a differential pressure control device, wherein:
the fuel cell has a cathode with a cathode gas inlet, and an anode with an anode gas inlet;
the differential pressure control device comprises a device body, a fluid chamber within the device body, at least one deflectable diaphragm, a valve, a first port configured to be connected to a supply of a cathode gas, a second port connected to the cathode gas inlet of the fuel cell, a third port configured to be connected to a supply of an anode gas, and a fourth port connected to the anode gas inlet of the fuel cell;
the valve is fluidically interposed between the third port and the fluid chamber;
the fluid chamber is fluidically connected only to the first port, to the second port, to the fourth port, and via the valve to the third port, and is otherwise enclosed within the device body;
the at least one deflectable diaphragm includes a first diaphragm arranged within the fluid chamber fluidically between, and providing a fluid seal between, the fourth port and the first and second ports; and
the valve comprises a valve seat defining a valve passage between the third port and the fluid chamber, a valve element movably arranged relative to the valve seat so as to selectively open and close the valve passage, and a valve pin mechanically connected to the first diaphragm and to the valve element so that the valve element and the first diaphragm are movable only in concert with one another.

11. The fuel cell system according to claim 10, wherein the differential pressure control device is purely mechanical and fluidic, and the fuel cell system includes no electrical controller for differential pressure control of the anode gas and the cathode gas.

12. The fuel cell system according to claim 10, wherein the fuel cell system includes no electrical gas pressure sensor.

13. The fuel cell system according to claim 10, wherein the at least one deflectable diaphragm further includes a second diaphragm arranged within the fluid chamber fluidically between the first diaphragm and the first and second ports, wherein an enclosed pressure transmission volume is defined and sealed between the first and second diaphragms within the fluid chamber, and wherein the differential pressure control device further comprises a pressure transmission fluid contained and confined in the enclosed pressure transmission volume between the first and second diaphragms.

14. The fuel cell system according to claim 13, wherein the pressure transmission fluid is configured to transmit a pressure of the cathode gas acting on the second diaphragm, via the pressure transmission fluid, onto the first diaphragm.

15. The fuel cell system according to claim 13, wherein the second diaphragm has no contact and no direct mechanical interaction with the valve pin.

16. The fuel cell system according to claim 13, wherein the first and second diaphragms are coupled to one another for respective deflection thereof only fluidically through the pressure transmission fluid and without any mechanical linkage therebetween.

17. The fuel cell system according to claim 13, wherein the first and second diaphragms respectively have different surface areas exposed to the pressure transmission fluid, and are thereby configured to always deflect through different deflection distances relative to one another.

18. The fuel cell system according to claim 10, wherein the first and second ports are merged to have in common together a single fluid connection to the fluid chamber.

19. The fuel cell system according to claim 10, wherein the valve further comprises a compression spring that is arranged between the valve element and the third port, and that is configured to apply a spring bias onto the valve element to urge the valve element in a valve closing direction toward the valve seat.

20. The fuel cell system according to claim 19, further comprising an actuator arranged and configured to act on the compression spring so as to control the spring bias.

* * * * *